United States Patent
Hwang et al.

(10) Patent No.: US 7,298,676 B2
(45) Date of Patent: Nov. 20, 2007

(54) OPTICAL PICKUP APPARATUS HAVING OPTICAL DETECTION AREA FOR COMPENSATING FOR TRACKING ERROR OFFSET

(75) Inventors: Won-Jae Hwang, Seoul (KR); Ho-Seop Jeong, Kyunggi-Do (KR); Dong-ik Shin, Kyunggi-do (KR)

(73) Assignee: Samsung Electro-Mechanics Co., Ltd, Kyunggi-Do (KR)

( * ) Notice: Subject to any disclaimer, the term of this patent is extended or adjusted under 35 U.S.C. 154(b) by 659 days.

(21) Appl. No.: 10/896,618

(22) Filed: Jul. 22, 2004

(65) Prior Publication Data
US 2005/0226106 A1    Oct. 13, 2005

(30) Foreign Application Priority Data
Apr. 8, 2004    (KR) ................ 10-2004-0024163

(51) Int. Cl.
*G11G 7/00*    (2006.01)

(52) U.S. Cl. ............................ 369/44.41; 369/44.37; 369/44.29

(58) Field of Classification Search ............ 369/44.41, 369/44.37, 44.29
See application file for complete search history.

(56) References Cited

U.S. PATENT DOCUMENTS

| | | | | |
|---|---|---|---|---|
| 5,815,473 A | * | 9/1998 | Takahashi et al. | ....... 369/44.26 |
| 5,892,744 A | * | 4/1999 | Ohba | ................ 369/44.37 |
| 6,222,803 B1 | * | 4/2001 | Uemura et al. | ......... 369/44.29 |
| 7,116,612 B2 | * | 10/2006 | Ogasawara et al. | ...... 369/44.37 |
| 7,215,609 B2 | * | 5/2007 | Shimano et al. | ......... 369/44.37 |

FOREIGN PATENT DOCUMENTS

KR    2001-98602    8/2001

* cited by examiner

*Primary Examiner*—Thang V. Tran
(74) *Attorney, Agent, or Firm*—Gottlieb, Rackman & Reisman, P.C.

(57) ABSTRACT

The optical pickup apparatus includes a light emitting means, an optical means, and an optical detection means. The light emitting means emits a single beam. The optical means diffracts the single beam, focuses the optical spot of the diffracted beam on a track, and transmits the diffracted beam to an outside. The optical detection means includes a first optical detection unit on which a central beam having a 0-order diffraction coefficient is focused, and second and third optical detection units on which side beams having ±1 diffraction coefficients are focused, respectively. Each optical detection unit is segmented into a specific number of optical detection areas, and at least one of the optical detection units is provided with an optical detection area on which a tracking error signal used to compensate for tracking offset attributable to optical axis offset of an objective lens is not formed.

22 Claims, 10 Drawing Sheets

PRIOR ART

DVD± RW 4.7GB

DVD-RAM 4.7GB

FIG. 11

PD surface

FIG. 12

PD surface

FIG. 13

PD surface

OPTICAL PICKUP APPARATUS HAVING OPTICAL DETECTION AREA FOR COMPENSATING FOR TRACKING ERROR OFFSET

BACKGROUND OF THE INVENTION

Field of the Invention

The present invention relates generally to an optical pickup apparatus having an optical detection area for compensating for tracking error and, more particularly, to an optical pickup apparatus, which performs focus/tracking servo follow-up on optical disks having different track pitches by compensating for tracking error offset attributable to the optical axis shift of an objective lens using the optical intensity distribution of the optical detection areas of an optical detection unit formed in an optical detection means.

Recently, due to the trend toward voluminous data, there have been developed optical disks that allow data to be stored and read in an optical manner, that is, that allow data to be stored by enabling the light transmittance, reflectivity, phase and polarization of a data storage location to be varied, and allow data to be read by enabling the variations of data to be read using light.

That is, an optical disk stores data on a circular disk, and allows data to be read by the irradiation of focused laser light thereon and the reading of the reflectivity, or the phase or polarization variations of the light at the time of reflection. The optical disk is a storage medium that allows minute pits having a light wavelength size to be formed on a disk and allows digital signals '1' and '0' according to the presence and absence of a pit to be generated, respectively.

Currently, in optical disk markets, there are being quickly popularized Digital Versatile Disk (DVD) multimedia systems compatible with optical disks having different track pitches, that is, a DVD-Random Access Memory (RAM) having a track pitch of 1.23 or 1.48 μm and a DVD-Read-Only Memory (ROM)/±R/RW having a track pitch of 0.74 μm. In conjunction with this, an optical pickup apparatus are required to have the compatibility that allows data to be stored in optical disks having different track pitches or data to be read from the optical disks.

The optical pickup apparatuses function to focus light without aberration on optical disks, converge light reflected by the diffractive interference of the pits of the optical disks, and convert the reflected light into electric signals so as to record and reproduce data.

In the meantime, the optical pickup apparatuses perform tracking/servo follow-up by a Push-Pull method using one beam or Differential Push-Pull (DPP) method to store data on optical disks or read data stored on optical disks.

Figure 1:
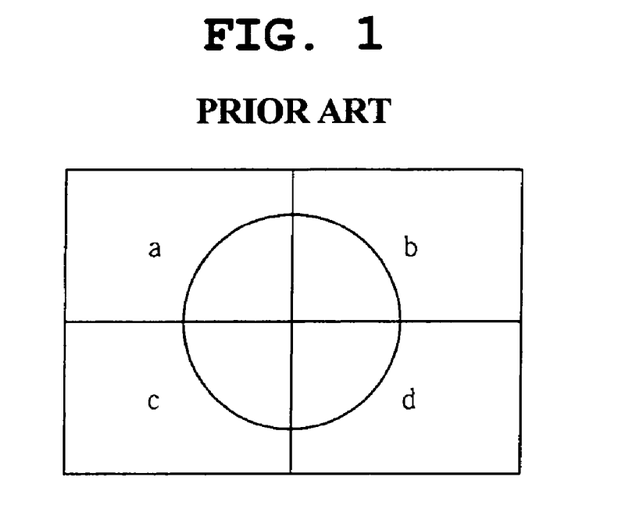
FIG. 1 is a plan view of a four-segmented photo detector used in an optical pickup apparatus.

Of the above-described tracking/servo follow-up methods, a Push-Pull method uses the difference in the amount of light detected by a four-segmented photo detector shown in FIG. 1 as a Tracking Error Signal (TES) that is expressed by [(a+c)−(b+d)].

Figure 2:
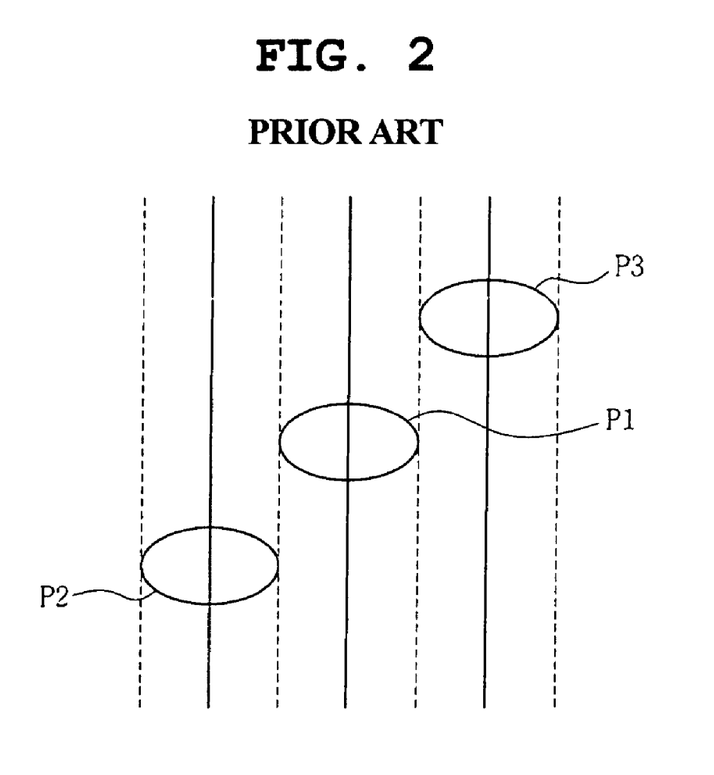
FIG. 2 is a diagram illustrating the principle of a Push-Pull method for performing the tracking servo follow-up of an optical pickup apparatus.
Figure 3:
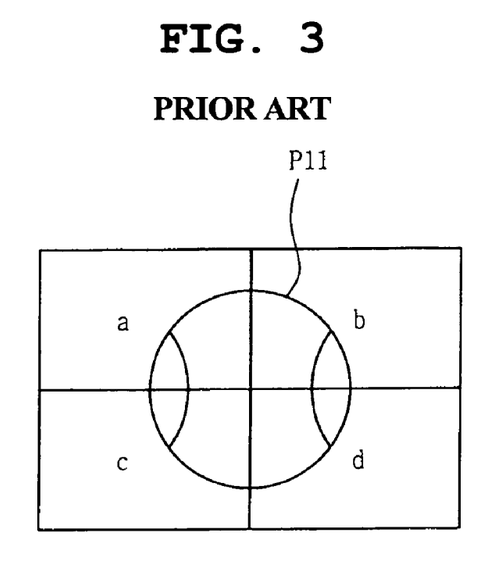
FIG. 3 is a view showing the optical intensity distribution of an optical spot focused on a photo detector of an optical pickup apparatus.

That is, when an optical spot formed by a central beam focused on an optical disk through an objective lens and optical spots formed by both side beams accurately follow the signal tracks of the optical disk, as shown in FIG. 2, an photo detector detects a tracking error signal for the optical disk using the optical intensity distribution of four segmented areas, as shown in FIG. 3.

In that case, when an optical beam focused from an objective lens follows the center of a signal track, optical intensity distribution on the optical detector is uniform and a tracking error signal calculated in terms of an electrical signal using [(a+c)−(b+d)] is 0.

However, in the case where light is focused from the objective lens OL onto the right side of a signal track, the optical intensity distribution of the photo detector is formed so that a large amount of light is irradiated onto the right side compared to the left side, so that a tracking error signal calculated in terms of an electric signal using [(a+c)−(b+d)] has a (+) value.

In contrast, in the case where light is focused from the objective lens OL onto the left side of a signal track, the optical intensity distribution of the photo detector is formed so that a large amount of light is irradiated onto the left side compared to the left side, so that a tracking error signal calculated in terms of an electric signal using [(a+c)−(b+d)] has a (−) value.

When the tracking error signal is detected by the photo detector as described above, the optical pickup allows a light beam irradiated from the objective lens to follow the center of the signal track by operating an actuator in conjunction with the detected tracking error signal, thus performing tracking servo for the optical disk.

In tracking servo follow-up for the optical disk, an optical spot focused on the track of an optical disk is required to a smaller optical intensity variation with respect to tracking shift attributable to the right and left movement of an objective lens.

Figure 4:
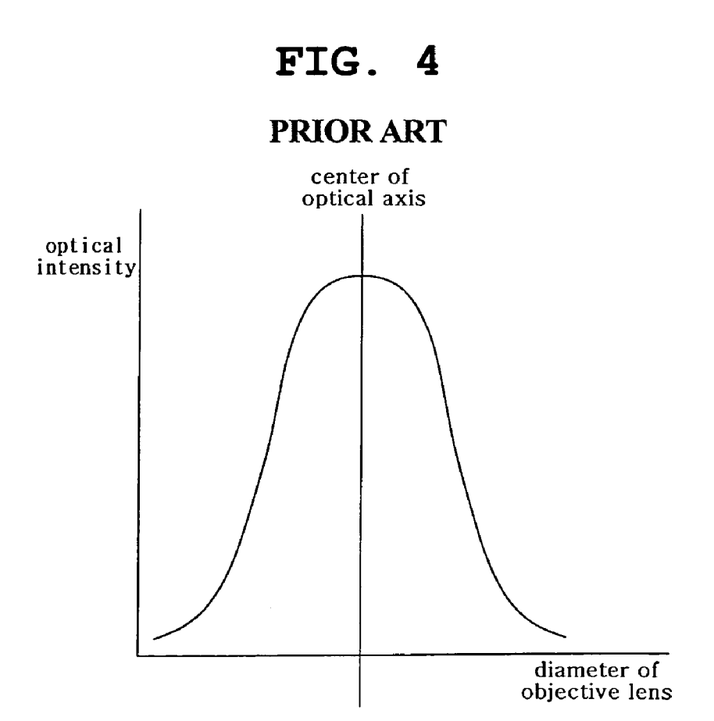
FIG. 4 is a graph illustrating the optical intensity distribution of an optical spot formed by a beam emitted from the laser diode of an optical pickup apparatus.

However, since an optical spot focused on the track of an optical disk, as shown in FIG. 4, has higher optical intensity distribution in the central region of the optical spot and lower optical intensity distribution in the side regions of the optical spot, in the case where an objective lens moves to the right or left due to the eccentricity of the optical disk, a problem arises in that a tracking error offset error occurs, thus making accurate tracking servo follow-up difficult.

In the case where diffracted light reflected by an optical disk is filtered by the diameter of an objective lens even though accurate tracking follow-up has been performed on an optical disk, a problem arises in that the balance of the right and left optical intensity distribution of an optical spot is not maintained, and thus a tracking error offset, in which a tracking error signal for the optical disk is output, occurs even though accurate tracking servo follow-up is being performed.

Figure 5:
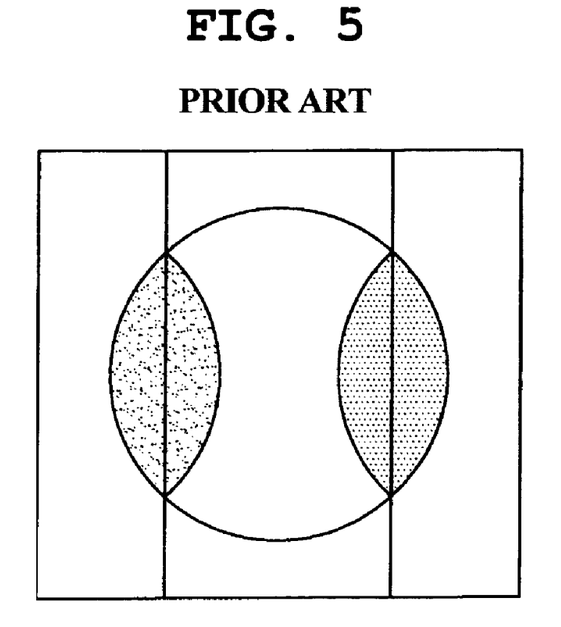
FIG. 5 is a view showing an optical spot formed by a diffracted beam incident from a DVD-ROM/±R/RW.

In the case of a DVD-ROM/±R/RW having a track pitch of 0.74 μm, a diffracted beam having a diffraction angle larger than an incident angle that an objective lens can accommodate is filtered out by the objective lens and only diffracted beams having 0 and ±1-order diffraction coefficients are incident on an optical detection means, thus forming an optical spot having a baseball shape, as shown in FIG. 5.

Figure 6:
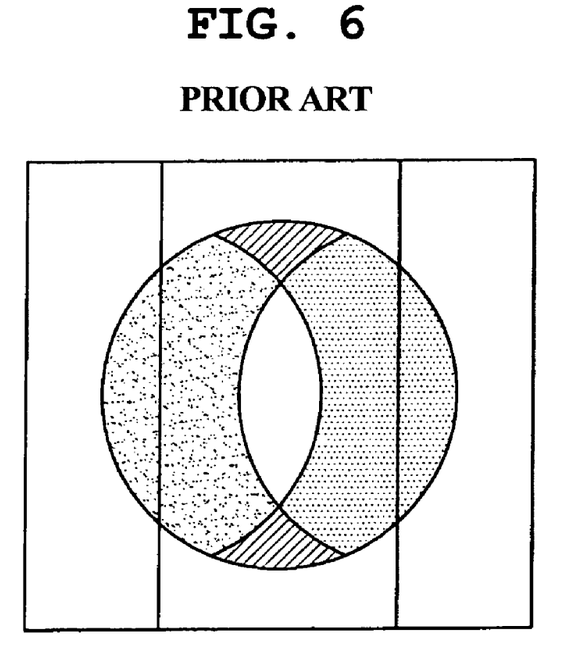
FIG. 6 is a view showing an optical spot formed by a diffracted beam incident from a DVD-RAM.

In contrast, in the case of a DVD-RAM having a track pitch of 1.23 or 1.48 μm, the diffracted light is made to have a smaller diffraction angle by a track pitch larger than that of a DVD-ROM/±R/RW, so that the incident diffracted light is not filtered out by the objective lens, but is incident on the optical detection means.

In this case, in the case where the objective lens shifts to the right or left, the lightest central beam of an optical spot formed by a diffracted beam reflected after the performance of tracking for an optical disk is moved to the right or left in conjunction with the shift of the objective lens, so that a tracking error offset signal for the optical disk is detected.

That is, the central beam of the optical spot is moved in conjunction with the right or left shift of the objective lens even though tracking servo for the optical disk has been successfully performed, so that a tracking error offset signal, in which tracking servo has not been successfully performed due to the difference of the balance of optical intensity distribution, occurs, thus preventing accurate tracking servo follow-up from being performed for the optical disk.

For another method for performing tracking/servo follow-up, Korean Unexamined Pat. Publication No. 2001-0098602 discloses a technical concept of detecting a tracking error signal using a DPP method.

Figure 7:
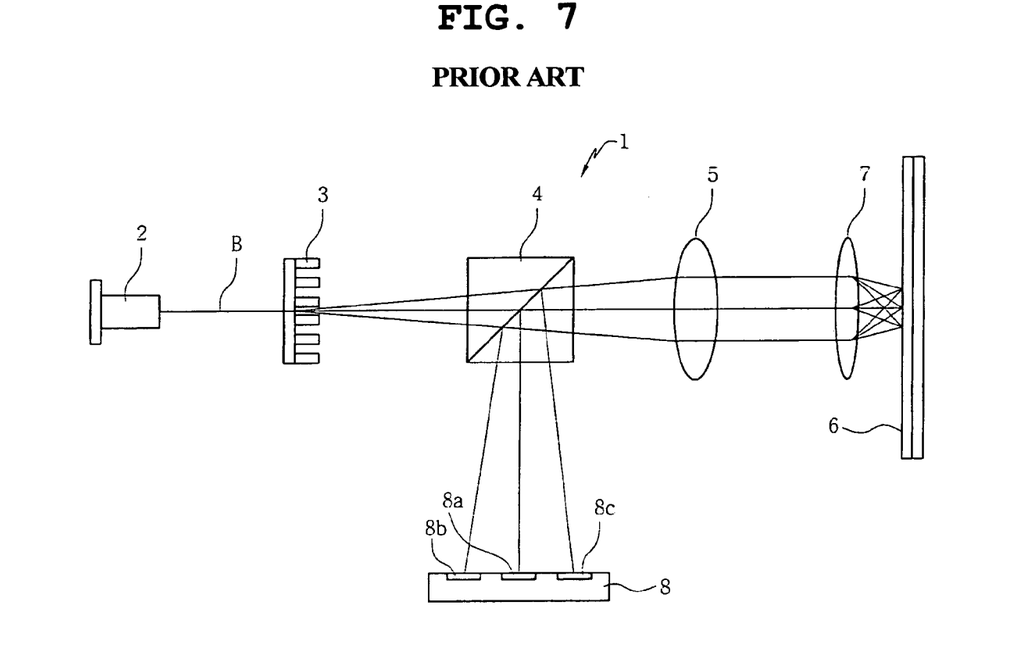
FIG. 7 is a diagram showing the construction of a conventional optical pickup apparatus that performs servo follow-up for an optical disk using a DPP method.

In Korean Unexamined Pat. Publication No. 2001-0098602, there is disclosed an optical pickup apparatus 1 that, as shown in FIG. 7, includes a laser source 2 generating a light beam B, a diffracting means 3 diffracting the light beam B emitted from the laser source 2, a beam splitter 4 transmitting the light beam B or reflecting the light beam B in a specific direction, a collimator lens 5 forming the parallel flux of light, an objective lens 7 focusing the light beam B on the signal surface of an optical disk 6, and a photo detector 8 receiving light returning from the optical disk 6.

Figure 8:
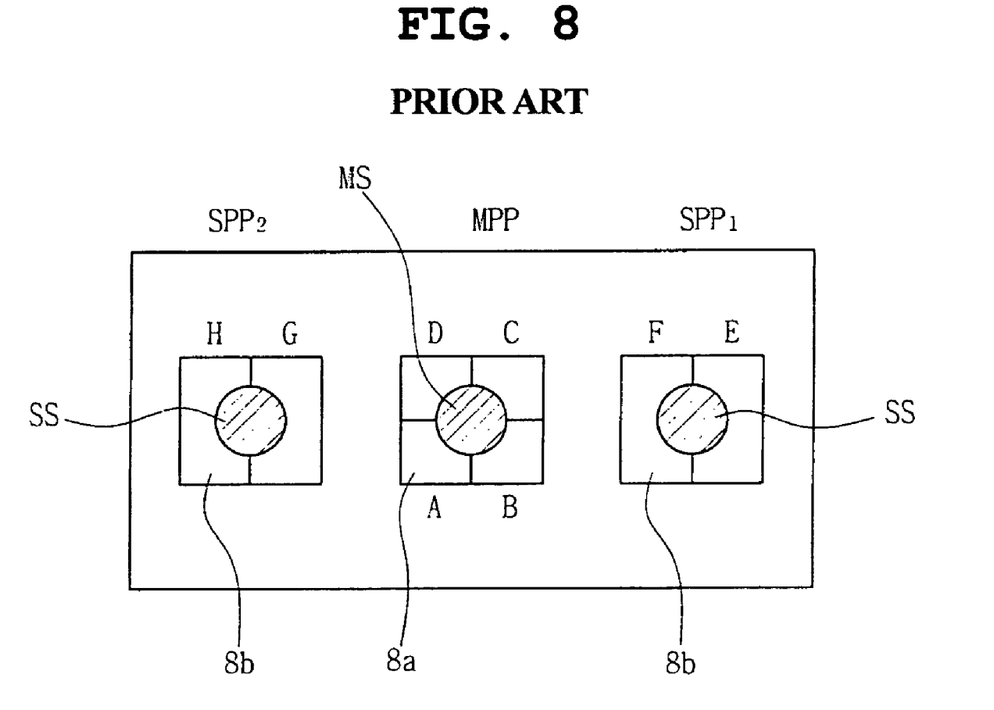
FIG. 8 is a diagram showing the construction of a photo detector formed in a conventional optical pickup apparatus.

The photo detector 8 constituting a part of the optical pickup 1, as shown in FIG. 8, is formed of a main photo detector 8a and two side photo detectors 8b. The main photo detector 8a is segmented into four units lengthwise and breadthwise and receives a main spot MS, and each of the side photo detectors 8b is segmented into two units breadthwise and receives a side spot SS.

In this case, the output signals of the units are indicated by A, B, C, D, E, F, G and H, respectively. A tracking error signal is generated from an output obtained by calculation between the output signals of the photo detectors 8a and 8b.

The main photo detector has four light receiving units lengthwise and breadthwise, and each of the side detectors has two light receiving units breadthwise. Separate push-pull signals are generated by the respective photo detectors, a tracking error signal is generated from an output obtained by calculation between the Push-Pull signals, and DC offset amounts occurring in the Push-Pull signals in the photo detectors are cancelled for the Push-Pull signals. As a result, even though the DC offset amounts of signals SSP1 and SSP2 are different, it is possible without using a calculation equation to prevent an offset amount from occurring in the Push-Pull signal. Accordingly, it is possible to perform high precision tracking servo, and high-density recording can be implemented.

However, the above-described DPP method has disadvantages in that it is difficult to apply the DPP method to optical disks having different sizes because the DPP method requires accuracy to locate an auxiliary beam on the boundary of a track, and it is impossible to perform servo because a tracking error signal is considerably reduced when disks having different track pitches are read.

That is, when the locations of side beams are adjusted on a single type of disks, the central and side beams of diffracted light, as shown in FIG. 3, are focused on the center of a track, so that it is possible to detect a tracking/focus error signal using a conventional astigmatic detection method or the conventional DPP method.

However, in the case where disks having different track pitches are read, a problem arises in that it is possible to detect a focus error signal using the conventional astigmatic detection method, but it is impossible to detect a tracking error signal using the conventional DPP method because side beams are not focused on the center of a track.

SUMMARY OF THE INVENTION

Accordingly, the present invention has been made keeping in mind the above problems occurring in the prior art, and an object of the present invention is to provide an optical pickup apparatus, which is capable of detecting a tracking error for a DVD-RAM by adjusting the angles of auxiliary beams so as to use a conventional DPP method, and detecting a tracking error for a DVD-ROM/±R/RW by compensating for tracking error offset attributable to the optical axis shift of an objective lens using optical intensity distribution formed on the specific optical detection areas of an optical detection unit on which the tracking error signal is not formed.

In order to accomplish the above object, the present invention provides an optical pickup apparatus, including a light emitting means for emitting a single beam that will be focused on a track of optical disks having different track pitches; an optical means for diffracting the single beam, focusing the optical spot of the diffracted beam having a specific diffraction coefficient on the track, and transmitting the diffracted beam, which is reflected by the track, to an outside; and an optical detection means including a first optical detection unit on which a central beam having a 0-order diffraction coefficient is focused, and second and third optical detection units on which side beams having ±1 diffraction coefficients are focused, respectively, each of the optical detection units being segmented into a specific number of optical detection areas, at least one of the optical detection units being provided with an optical detection area on which a tracking error signal used to compensate for tracking error offset attributable to optical axis shift of an objective lens is not formed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

An optical pickup apparatus, in which optical detection areas for tracking error offset are formed in accordance with the present invention, detects a tracking/focus error signal using the optical intensity distribution of light reflected and diffracted from an optical disk in the case where the beam incident from an objective lens falls on the center of a track of the optical disk, and detects a tracking/focus error signal by compensating for tracking error offset using the optical intensity distribution of optical detection areas on which the tracking error signal is not formed or that is barely influenced by the tracking error signal in the case where the beam incident from an objective lens does not fall on the center of a track of the optical disk. The optical pickup apparatus, as shown in FIG. 9, is constructed to include a light emitting means 100, an optical means 200 and an optical detection means 300.

In that case, the light emitting means 100 emits laser light to record and reproduce voice/image data on and from an optical disk 400 having a specific track pitch and to detect focus/tracking signals so as to accurately read data recorded tracks. For example, the light emitting means 100 may be a laser diode that emits laser light having a wavelength of 780 or 650 nm.

Figure 9:
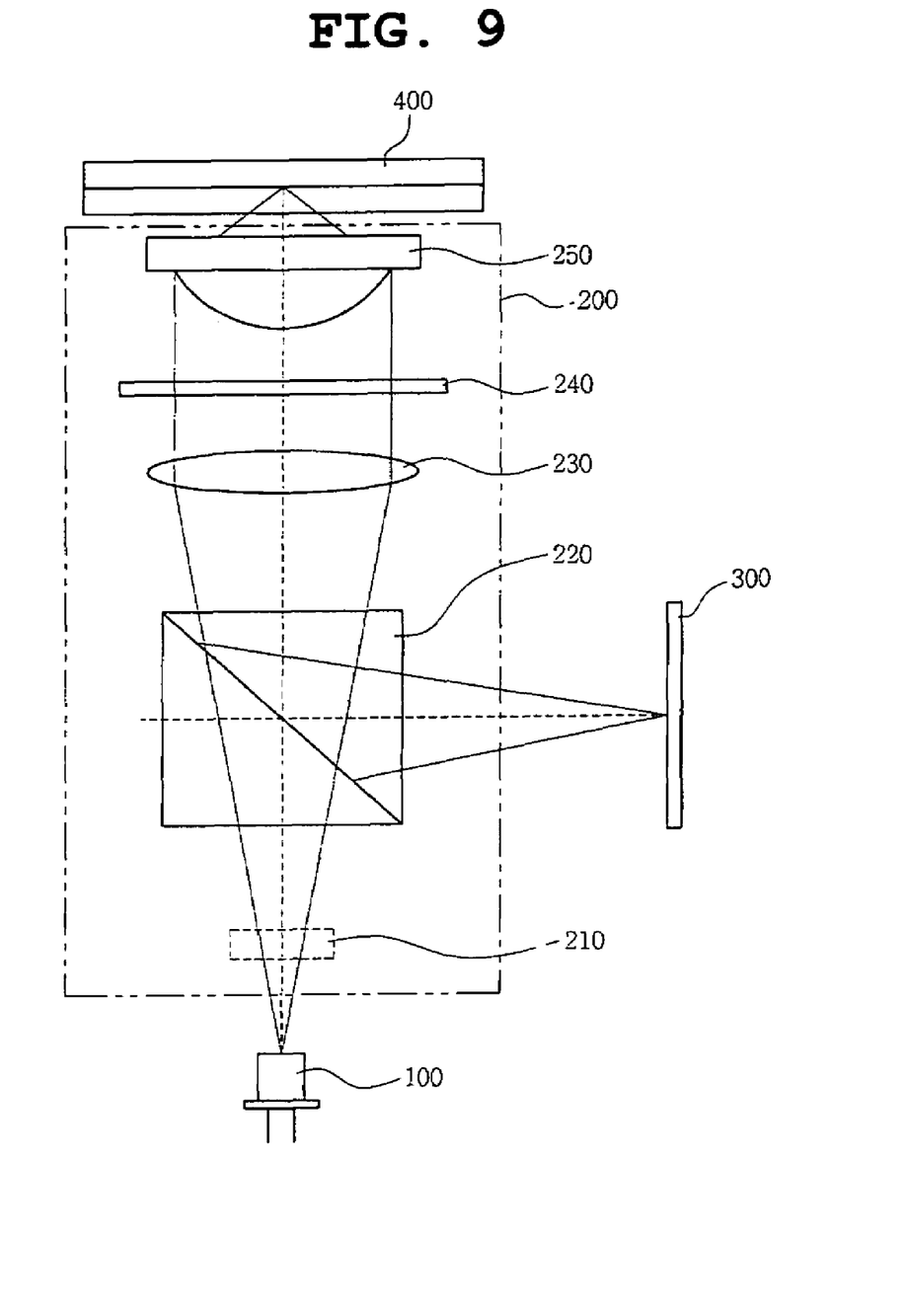
FIG. 9 is a diagram showing an optical pickup apparatus in which optical detection areas for compensating for tracking error offset are formed, in accordance with the present invention.

The optical means 200 functions to focus laser light irradiated from the light emitting means 100 on a track of the optical disk 400, and, as shown in FIG. 9, includes a diffraction plate 210, a beam splitter 220, a collimator lens 230, a wavelength plate 240 and an objective lens 250.

The diffraction plate 210 produces linearly polarized laser light having a specific diffraction coefficient, in particular, a 0, +1 or −1-order diffraction coefficient, by diffracting the laser light irradiated from the light emitting means 100, and transmits the linearly polarized laser light to the beam splitter 220. In particular, the diffraction plate 210 is a grating.

The beam splitter 220 allows linearly polarized laser light, which has a specific diffraction coefficient and is incident from the diffraction plate 210, to branch off to the direction of the optical disk 400.

Furthermore, the beam splitter 220 also functions to receive laser light reflected by the optical disk, and allows the laser light to branch off to the direction of an optical detection means (will be described later) so as to perform tracking/servo follow-up on the optical disk 400.

The collimator lens 230 converts linearly polarized laser light, which has a specific diffraction coefficient, is allowed to branch off by the beam splitter 220 and is incident from the beam splitter 220, into parallel light, and allows the parallel light to be incident on the quarter wave plate 240.

The quarter wave plate 240 converts linearly polarized laser light having a specific diffraction coefficient, which is incident parallel to each other from the collimator lens 230, into circularly polarized laser light, and allows the circularly polarized laser light to be incident on the objective lens 250.

The objective lens 250 focuses laser light, which is incident from the quarter wave plate 240, on a track of the optical disk 400 storing specific image and voice data, in more detail, a DVD-RAM having a track pitch of 1.23 or 1.48 μm or DVD-ROM/±R/RW having a track pitch of 0.74 μm.

The optical detection means 300 includes first, second and third optical detection units on which a central beam having a 0-order diffraction coefficient and side beams having ±1-order diffraction coefficients are focused, respectively. Each of the optical detection units is divided into a specific number of optical detection regions, and at least one of the optical detection units is provided with an optical detection area on which a tracking error signal, which is used to compensate for tracking error offset attributable to the optical axis shift of an objective lens, is not formed.

Figure 10:
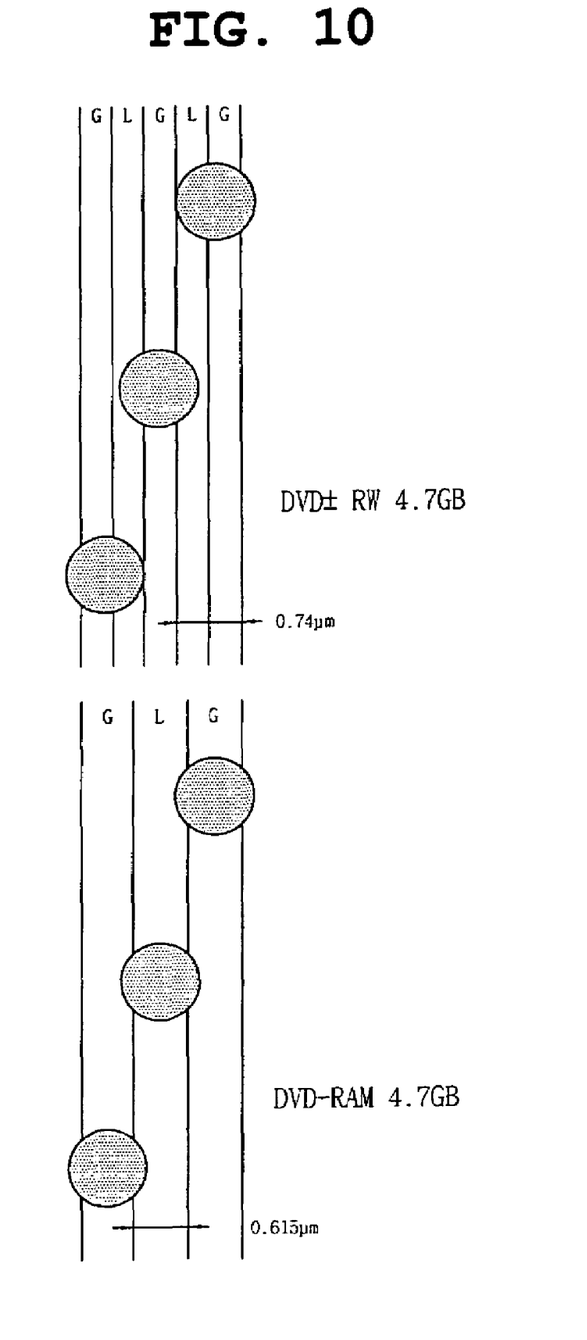
FIG. 10 is a diagram showing the positions where the central and side beams of diffracted light are focused on optical disks having different track pitches.
Figure 11:
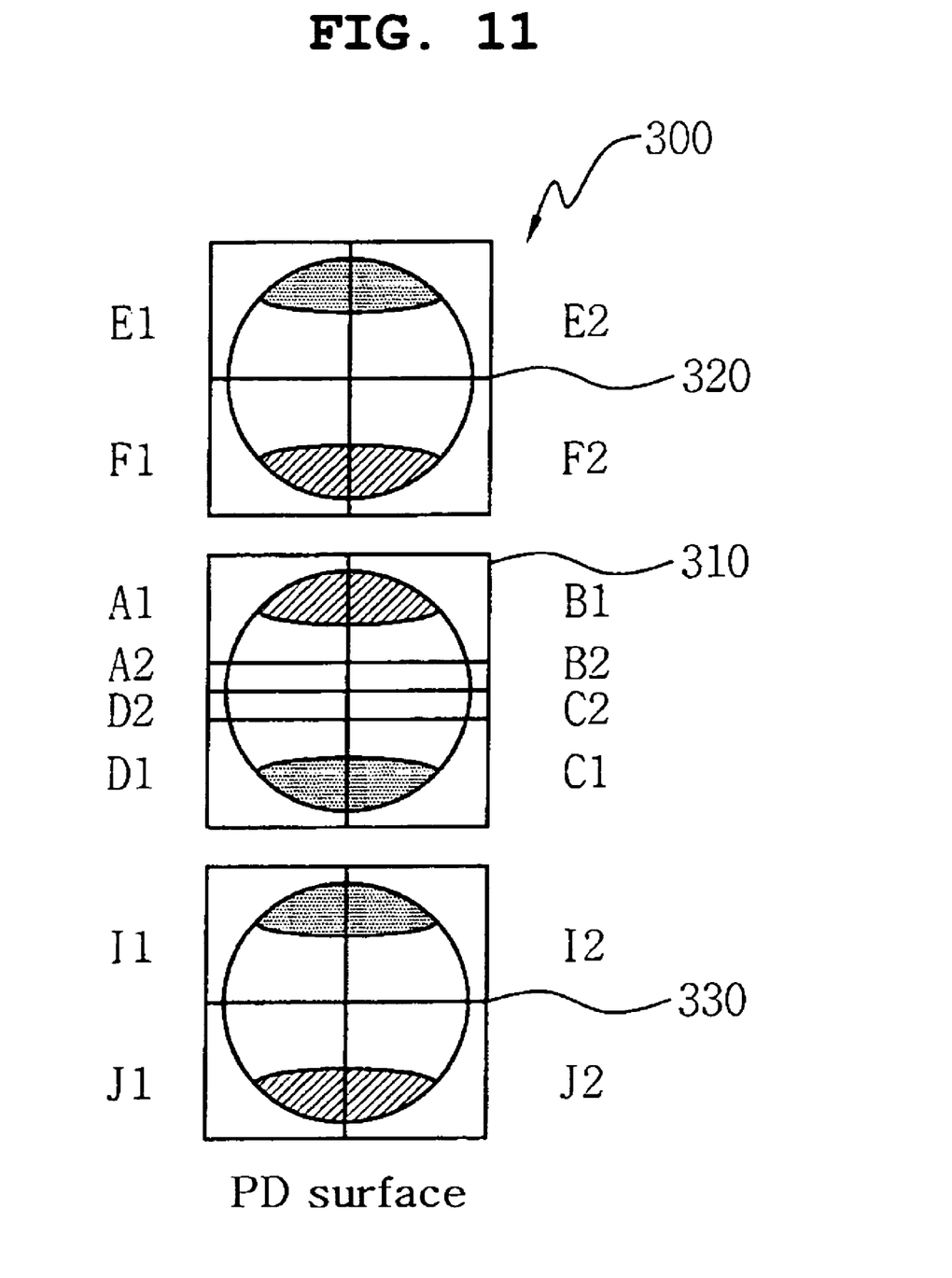
FIG. 11 is a diagram showing the construction of an optical detection means in which optical detection areas for compensating for tracking error offset are formed, in accordance with a first embodiment of the present invention.
Figure 12:
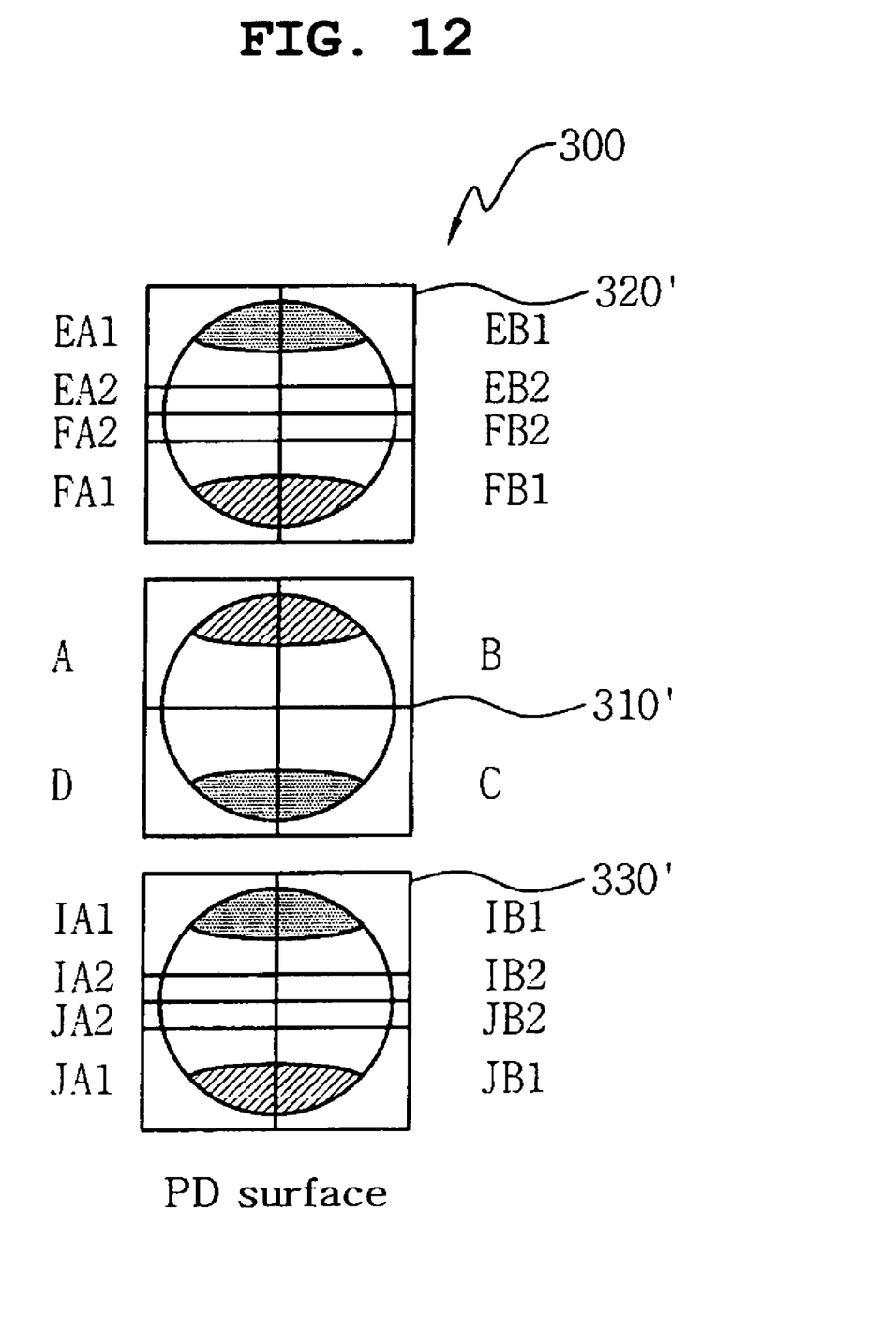
FIG. 12 is a diagram showing the construction of an optical detection means in which optical detection areas for compensating for tracking error offset are formed, in accordance with a second embodiment of the present invention.
Figure 13:
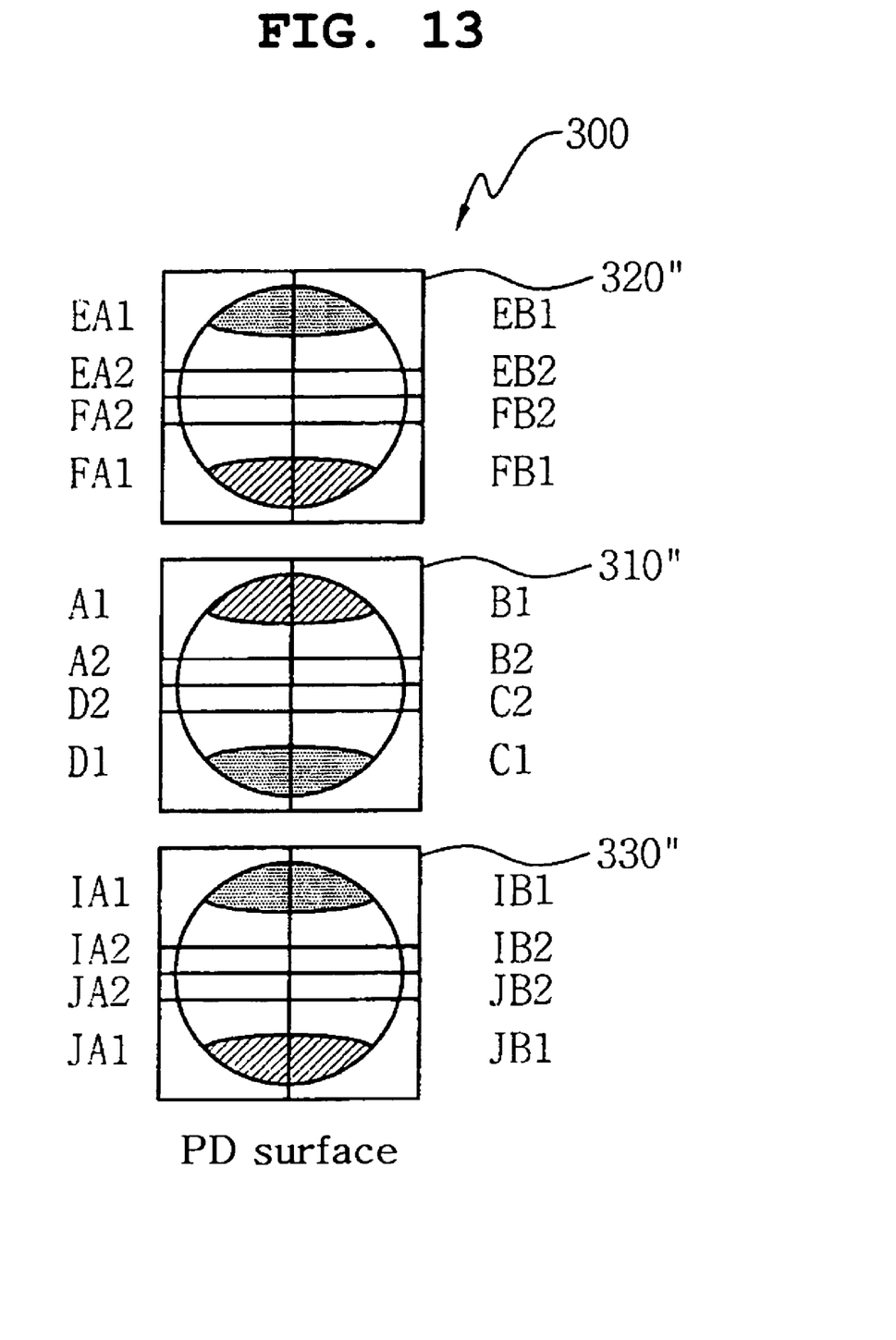
FIG. 13 is a diagram showing the construction of an optical detection means in which optical detection areas for compensating for tracking error offset are formed, in accordance with a third embodiment of the present invention.

In this case, when central and side beams of diffracted light incident from the optical means, as shown in FIG. 10, are focused on the center of a track of a DVD-RAM 400 having a track pitch of 1.23 μm, the optical detection means, as shown in FIGS. 11 to 13, detects the focus error signal of the optical disk 400 using a Differential Astigmatic Detection (DAD) method based on the optical intensity distribution of the central and side beams that are focused on first optical detection units 310, 310' and 310", second detection units 320, 320' and 320" and third optical detection units 330, 330' and 330", respectively.

The optical detection means 300 detects the tracking error signal of the optical disk 400 using a DPP method based on the optical intensity distribution of central and side beams that are focused on the first optical detection units 310, 310' and 310", the second detection units 320, 320' and 320" and the third optical detection units 330, 330' and 330", respectively.

When diffracted beams having 0 and ±1 diffraction coefficients, as shown in FIG. 10, are focused on DVD-ROM/±R/RW 400 having a track pitch of 0.74 μm through the optical means 200, the optical detection means 300 detects the focus error signal of the optical disk using a astigmatic detection method based on the optical intensity distribution of the central beam that is focused on the first optical units 310, 310' and 310".

In the case where the DVD-ROM/±R/RW 400 has a relatively narrow track pitch compared to a DVD-RAM, so that a side beam is not located at the central region of a land, and thus a tracking error signal is not detected using a DPP method, the optical detection means 300 detects the tracking error signal of the optical disk 400 using a Modified Push-Pull (MPP) method that utilizes the optical intensity distribution of an optical detection area of the first optical detection units 310, 310' and 310", the second detection units 320, 320' and 320" and the third optical detection units 330, 330' and 330", on which a tracking error signal is not formed, to compensate for tracking error offset.

Although the detection of a focus/tracking error signal of an optical disk is being described based on the case where the central and side beams of diffracted light fall on the center of a track of a DVD-RAM but do not fall on the center of a track of a DVD-ROM/±R/RW, the present invention is not limited to this case but is applied to the opposite case.

With reference to FIGS. 11 to 13, a process of detecting the tracking/focus error signals of optical disks having different track pitches using the optical intensity distribution of reflected beams focused on an optical detection pattern having a specific shape formed on the optical detection means is described in detail below.

First Embodiment

The optical detection means 300 is the place on which optical spots formed by the central and side beams of diffracted light having a specific diffraction coefficient are formed. The optical detection means 300, as shown in FIG. 11, includes a first detection unit 310, a second detection unit 320 and a third detection unit 330.

In that case, the first detection unit 310 is eight-segmented into optical detection areas A1, B1, A2, B2, D1 and C1 on which the central beam of diffracted light having a 0-order diffraction coefficient is focused.

The optical detection areas A2, B2, D2 and C2 formed on the central region of the first detection unit 310 are optical detection areas on which a tracking error signal is not formed. The optical intensity distribution of the optical detection areas is used to compensate for tracking error offset attributable to the optical axis shift of the objective lens having a track pitch that causes at least one side beam of diffracted light not to be focused on the center of a track.

The second optical detection unit 320 is formed above the first optical detection unit 310, and is four-segmented into optical detection areas E1, E2, F1 and F2 on which a side beam having a −1-order diffraction coefficient.

The third optical detection unit 330 is formed below the first optical detection unit 310, and is four-segmented into optical detection areas I1, I2, J1 and J2 on which a side beam having a −1-order diffraction coefficient is focused.

In this case, when the central and side beams of diffracted light, as shown in FIG. 10, falling on the center of a track of the DVD-RAM 400 having a track pitch of 1.23 μm are focused on the first, second and third optical detection units 310, 320 and 330 through the optical means 200, the optical detection means 300 detects the focus error signal of a DVD-RAM 400 using a DAD method that utilizes the optical intensity distribution of the central and side beams of the diffracted beam that are focused on the optical detection units 310, 320 and 330 segmented in a specific pattern, as shown in FIG. 11.

$$\text{Focus Error Signal (FES)} = \tag{1}$$

$$(A1 + A2 + C1 + C2) - (B1 + B2 + D1 + D2) +$$

$$\beta[(E1 + F2 + I1 + J2) - (F1 + F2 + J1 + I2)]$$

where A1, A2, B1, B2, C1, C2, D1, D2, E1, E2, F1, F2, I1, I2, J1 and J2 are voltages corresponding to the amounts of light, and β is gain.

The optical detection means 300 detects the tracking error signal of a DVD-RAM 400 using DPD that calculates the optical intensity distribution of the central and side beams of diffracted light that are focused on the optical detection units 310, 320 and 330.

$$\text{Tracking Error Signal (TES)} = \tag{2}$$

$$(A1 + A2 + B1 + B2) - (C1 + C2 + D1 + D2) +$$

$$\beta[(E1 + E2 + I1 + I2) - (F1 + F2 + J1 + J2)]$$

In the case where the optical disk 400 is a DVD-ROM/±R/RW that, as shown in FIG. 10, has a relatively narrow track pitch, in detail, a track pitch of 0.74 μm, compared to a DVD-RAM and a side beam does not fall on the center of a track, the optical detection means 300, as shown in FIG. 11, detects the focus error signal of the DVD-ROM/±R/RW 400 using an astigmatic detection method that utilizes the optical intensity distribution of the first optical detection unit 310 on which a central beam having a 0-order diffraction coefficient is focused.

Focus Error Signal (FES)=(A1+C1)−(B1+D1), or $$\text{Focus Error Signal (FES)} = (A1+A2+C1+C2) - (B1+B2+D1+D2) \tag{3}$$

Furthermore, the optical detection means 300 detects the tracking error signal of a DVD-ROM/±R/RW 400 using an MPP method that utilizes the optical intensity of a central region on which a tracking error signal is not formed, in detail, areas A2, B2, D2 and C2, to compensate for tracking error offset attributable to the optical axis shift of the objective lens 250.

$$\text{Tracking Error Signal (TES)} = \tag{4}$$

$$(A1 + B1) - (C1 + D1) - \beta[(A2 + B2) - (C2 + D2)]$$

In this case, the optical detection means 300 may detect the tracking error signal of a DVD-ROM/±R/RW 400 using another MPP method that utilizes the optical intensity of a central region A2, B2, D2 and C2, on which a tracking error signal is not formed, to compensate for tracking error offset attributable to the optical axis shift of the objective lens 250.

$$\text{Tracking Error Signal (TES)} = (A1 + A2 + B1 + B2) - \tag{5}$$

$$(C1 + C2 + D1 + D2) - \beta[(A2 + B2) - (C2 + D2)]$$

Second Embodiment

The optical detection means 300 is the place on which optical spots formed by diffracted beams having specific diffraction coefficients and being incident from the optical detection means 300 are focused, and, as shown in FIG. 12, includes a first optical detection unit 310', a second optical detection unit 320' and a third optical detection unit 330'.

In this case, the first optical detection unit 310' is four-segmented into areas A, B, C and D on which the central beam of diffracted light having a 0-order diffraction coefficient is focused.

The second optical detection unit 320' is formed above the first optical unit 310', and is eight-segmented into areas $E_{A1}$, $E_{B1}$, $E_{A2}$, $E_{B2}$, $F_{A2}$, $F_{B2}$, $F_{A1}$, and $F_{B1}$ on which a side beam having a +1-order diffraction coefficient is focused.

The optical detection areas $E_{A2}$, $E_{B2}$, $F_{A2}$ and $F_{B2}$ that are formed on the central portion of the second optical detection unit 320' are the optical detection areas on which a tracking error signal is not formed or that are barely influenced by a tracking error signal. The optical intensity distribution of the optical detection areas is used to compensate for tracking error offset attributable to the optical axis offset of the objective lens with respect to the optical disk having track pitch that causes at least one side beam of diffracted light not to be focused on the center of a track.

The third optical detection unit 330' is formed below the first optical detection unit 310', and is eight-segmented into areas $I_{A1}$, $I_{B1}$, $I_{A2}$, $I_{B2}$, $J_{A2}$, $J_{B2}$, $J_{A1}$, and $J_{B1}$.

The optical detection areas $I_{A2}$, $I_{B2}$, $J_{A2}$ and $J_{B2}$ that are formed on the central portion of the third optical detection unit 330' are the optical detection areas on which a tracking error signal is not formed or that are barely influenced by a tracking error signal. The optical intensity distribution of the optical detection areas is used to compensate for tracking error offset attributable to the optical axis offset of the objective lens with respect to the optical disk having track pitch that causes at least one side beam of diffracted light not to be focused on the center of a track.

In this case where the central and side beams of diffracted light, as shown in FIG. 10, falling on the center of a track of the DVD-RAM 400 having a track pitch of 1.23 μm are focused on the first, second and third optical detection units 310', 320' and 330' through the optical means 200, the optical detection means 300 detects the focus error signal of a DVD-RAM 400 using a DAD method that utilizes the optical intensity distribution of the central and side beams of the diffracted beam that are focused on the optical detection units 310', 320' and 330' segmented in a specific pattern, as shown in FIG. 12.

$$\text{Focus Error Signal (FES)} = (A+C) - (B+D) + \quad (6)$$
$$\beta[(E_{A1} + E_{A2} + F_{B1} + F_{B2} + I_{A1} + I_{A2} + J_{B1} + J_{B2}) - $$
$$(F_{A1} + F_{A2} + E_{B1} + E_{B2} + J_{A1} + J_{A2} + I_{B1} + I_{B2})]$$

The optical detection means 300 detects the tracking error signal of a DVD-RAM 400 using a DPP method that utilizes the optical intensity distribution of the central and side beams of diffracted light that are focused on the optical detection units 310', 320' and 330'.

$$\text{Tracking Error Signal (TES)} = (A+B) - (D+C) + \quad (7)$$
$$\beta[(E_{A1} + E_{A2} + E_{B1} + E_{B2} + I_{A1} + I_{A2} + I_{B1} + I_{B2}) - $$
$$(F_{A1} + F_{A2} + F_{B1} + F_{B2} + J_{A1} + J_{A2} + J_{B1} + J_{B2})]$$

In the case where the optical disk 400 is a DVD-ROM/±R/RW that has a relatively narrow track pitch, in detail, a track pitch of 0.74 μm, compared to a DVD-RAM and a side beam does not fall on the center of a track, the optical detection means 300 detects the focus error signal of the DVD-ROM/±R/RW 400 using astigmatic detection method that utilizes the optical intensity distribution of the first optical detection unit 310' on which a central beam having a 0-order diffraction coefficient is focused.

$$\text{Focus Error Signal (FES)} = (A+C) - (B+D) \quad (8)$$

The optical detection means 300 detects the tracking error signal of a DVD-ROM/±R/RW 400 using an MPP method that utilizes the optical intensity of a central region on which a tracking error signal is not formed, in detail, areas $E_{A2}$, $E_{B2}$, $F_{A2}$, $F_{B2}$, $I_{A2}$, $I_{B2}$, $J_{A2}$ and $J_{B2}$, to compensate for tracking error offset attributable to the optical axis shift of the objective lens 250.

$$\text{Tracking Error Signal (TES)} = (A+B) - (D+C) + \beta[(E_{A2} + E_{B2} + I_{A2} + I_{B2}) - (F_{A2} + F_{B2} + J_{A2} + J_{B2})] \quad (9)$$

Third Embodiment

The optical detection means 300 is the place on which optical spots formed by diffracted beams having specific diffraction coefficients incident from the optical detection means 300 are focused, and, as shown in FIG. 12, includes a first optical detection unit 310', a second optical detection unit 320" and a third optical detection unit 330".

In this case, the first optical detection unit 310" are eight-segmented into areas A1, B1, A2, B2, D2, C2, D1 and C1 on which a central beam having a 0-order diffraction coefficient is focused.

In this case, the optical detection areas A2, B2, D2 and C2 that are formed on the central portion of the first optical detection unit 310" are the optical detection areas on which a tracking error signal is not formed or that are barely influenced by a tracking error signal. The optical intensity distribution of the optical detection areas is used to compensate for tracking offset attributable to the optical axis shift of the objective lens with respect to the optical disk having track pitch that causes at least one side beam of diffracted light not to be focused on the center of a track.

The second optical detection unit 320" is formed above the first optical detection unit 310". The second optical detection unit 320" is eight-segmented into areas $E_{A1}$, $E_{B1}$, $E_{A2}$, $E_{B2}$, $F_{A2}$, $F_{B2}$, $F_{A1}$ and $F_{B1}$.

The optical intensity distribution of optical detection areas $E_{A2}$, $E_{B2}$, $F_{A2}$ and $F_{B2}$, which are formed on the center region of the second optical detection unit 320", and on which a tracking error signal is formed or that are barely influenced by a tracking error signal, is used to compensate for tracking error offset attributable to the optical axis shift of the objective lens with respect to an optical disk having a track pitch that causes at least one of side beams not to be focused on the center of a track.

The third optical detection unit 330" is formed below the first optical detection unit 310", and is eight-segmented into areas $I_{A1}$, $I_{B1}$, $I_{A2}$, $I_{B2}$, $J_{A2}$, $J_{B2}$, $J_{A1}$, and $J_{B1}$.

The optical intensity distribution of optical detection areas $I_{A2}$, $I_{B2}$, $J_{A2}$ and $J_{B2}$, which are formed on the center region of the third optical detection unit 330", and on which a tracking error signal is formed or that are barely influenced by a tracking error signal, is used to compensate for tracking error offset attributable to the optical axis shift of the objective lens with respect to an optical disk having a track pitch that causes at least one of side beams not to be focused on the center of a track.

In this case where the optical spots formed by the central and side beams of diffracted light falling on the centers of the tracks of the DVD-RAM 400 having a track pitch of 1.23 μm are focused on the first, second and third optical detection units 310", 320" and 330" through the optical means 200, respectively, the optical detection means 300 detects the focus error signal of a DVD-RAM 400 using a DAD method that utilizes the optical intensity distribution of the diffracted beams that are focused on the optical detection units 310", 320" and 330".

$$\text{Focus Error Signal (FES)} = \quad (10)$$
$$(A1 + A2 + C1 + C2) - (B1 + B2 + D1 + D2) + $$
$$\beta[(E_{A1} + E_{A2} + F_{B1} + F_{B2} + I_{A1} + I_{A2} + J_{B1} + J_{B2}) - $$
$$(F_{A1} + F_{A2} + E_{B1} + E_{B2} + J_{A1} + J_{A2} + I_{B1} + I_{B2})]$$

Furthermore, the optical means 300 detects the tracking error signal of a DVD-RAM 400 using a DPP method that utilizes the optical intensity distribution of central and side beams that are focused on the optical detection units.

$$\text{Tracking Error Signal (TES)} = \tag{11}$$
$$(A1 + A2 + B1 + B2) - (C1 + C2 + D1 + D2) +$$
$$\beta[(E_{A1} + E_{A2} + E_{B1} + E_{B2} + I_{A1} + I_{A2} + I_{B1} + I_{B2}) -$$
$$(F_{A1} + F_{A2} + F_{B1} + F_{B2} + J_{A1} + J_{A2} + J_{B1} + J_{B2})]$$

In the case where the optical disk 400 is a DVD-ROM±R/RW that has a relatively narrow track pitch, in detail, a track pitch of 0.74 μm, compared to a DVD-RAM and a side beam does not fall on the center of a track, the optical detection means 300 detects the focus error signal of the DVD-ROM/±R/RW 400 using astigmatic detection method that utilizes the optical intensity distribution of the first optical detection unit 310" on which a central beam having a 0-order diffraction coefficient is focused.

$$\text{Focus Error Signal } (FES) = (A1+C1)-(B1+D1)$$

, or $$\text{Focus Error Signal } (FES) = (A1+A2+C1+C2)-(B1+B2+D1+D2) \tag{12}$$

The optical detection means 300 detects the tracking error signal of a DVD-ROM/±R/RW 400 using an MPP method that utilizes the optical intensity of central regions of the second and third optical detection units 320" and 330" (on which side beams having a ±1 diffraction coefficient are focused), on which the tracking error signal is not formed, to compensate for tracking error offset attributable to the optical axis shift of the objective lens 250.

$$\text{Tracking Error Signal (TES)} = (A1 + B1) - (C1 + D1) - \tag{13}$$
$$\beta[(E_{A2} + E_{B2} + I_{A2} + I_{B2}) - (F_{A2} + F_{B2} + J_{A2} + J_{B2})],$$

or $$\text{Tracking Error Signal (TES)} =$$
$$(A1 + A2 + B1 + B2) - (C1 + C2 + D1 + D2) -$$
$$\beta[(E_{A2} + E_{B2} + I_{A2} + I_{B2}) - (F_{A2} + F_{B2} + J_{A2} + J_{B2})]$$

The optical detection means 300 may detect the tracking error signal of a DVD-ROM/±R/RW 400 using another MPP method that utilizes the optical intensity of optical detection areas, on which the tracking error signal is not formed and that are formed at the center portions of the first, second and third optical detection units 310", 320" and 330", to compensate for tracking error offset attributable to the optical axis shift of the objective lens 250.

$$\text{Tracking Error Signal (TES)} = (A1 + A2 + B1 + B2) - \tag{14}$$
$$(C1 + C2 + D1 + D2) - \beta[(E_{A2} + E_{B2} + A2 + B2 + I_{A2} + I_{B2}) -$$
$$(F_{A2} + F_{B2} + C2 + D2 + J_{A2} + J_{B2})]$$

Although in the above-described embodiment, the detection of a focus/tracking error signal of an optical disk has been described based on the case where the central and side beams of diffracted light fall on the center of a track of a DVD-RAM but do not fall on the center of a track of a DVD-ROM/±R/RW, the present invention is not limited to this case but is applied to the opposite case.

As described above, the present invention compensates for tracking error offset attributable to the optical axis offset of an objective lens using the optical intensity distribution of the optical detection areas of an optical detection means (on which the central and side beams of diffracted light incident from an optical disk are focused) on which a tracking error signal is not formed.

As a result, the present invention can perform tracking/servo follow-up for optical disks having different track pitches by compensating for tracking error offset attributable to the optical axes shift of the objective lens using the optical intensity distribution of the optical areas on which a tracking error signal is not formed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup apparatus, comprising:
    light emitting means for emitting a single beam that will be focused onto a track of optical disks having different track pitches;
    optical means for diffracting the single beam, focusing the optical spot of the diffracted beam having a specific diffraction coefficient on the track, and transmitting the diffracted beam, which is reflected by the track, to an outside; and
    optical detection means comprising a first optical detection unit on which a central beam having a 0-order diffraction coefficient is focused, and second and third optical detection units on which side beams having ±1 diffraction coefficients are focused, respectively, each of the optical detection units being segmented into a specific number of optical detection areas, at least one of the optical detection units being provided with an optical detection area, on which a tracking error signal is not formed, to compensate for tracking error offset attributable to optical axis shift of an objective lens.

2. The optical pickup apparatus as set forth in claim 1, wherein:
    when the central and side beams of the diffracted light fall on the center of the track of the optical disk, the optical pickup apparatus detects a focus error signal using a Differential Astigmatic Detection (DAD) method that utilizes optical intensity distribution of the first optical detection unit on which the central beam having a 0-order diffraction coefficient is focused, and detects a tracking error signal using a Differential Push-Pull (DPP) method that utilizes optical intensity distribution formed on the optical detection units; and
    when at least one of the side beams does not fall on the center of the track of the optical disk, the optical pickup apparatus detects the focus error signal using an astigmatic detection method that utilizes optical intensity distribution of the first optical detection unit on which the central beam having an 0-order diffraction coefficient is focused, and detects a tracking error signal using a Modified Push-Pull (MPP) method that utilizes optical intensity distribution of optical detection areas, which are formed on the optical detection units and on which the tracking error signal is not formed, to compensate for tracking error offset.

3. The pickup apparatus as set forth in claim 1, wherein the optical means comprises:
- a polarization plate forming a linearly polarized, diffracted beam having a specific diffraction coefficient by diffracting the beam emitted from the light emitting means;
- a beam splitter branching off the linearly polarized, diffracted beam incident from the diffraction plate toward the optical disk and branching off the linearly polarized, diffracted beam reflected by the optical disk to the optical detection means;
- a collimator lens converting the linearly polarized, diffracted beam, which is branched off from the beam splitter, into parallel light;
- a quarter wave plate converting the parallel light incident from the collimator lens into a circularly polarized, diffracted beam, converting the circularly polarized, diffracted beam incident from the optical disk into a linearly polarized, diffracted beam, and emitting the linearly polarized, diffracted beam to the collimator lens; and
- an objective lens forming an optical spot on the track of the optical disk by focusing the circularly polarized, diffracted beam incident from the quarter wave plate.

4. The optical pickup apparatus as set forth in claim 1, wherein:
- the first optical detection unit is eight-segmented into optical detection areas A1, B1, A2, B2, D2, C2, D1 and C1, and the tracking error signal is not formed on center ones A2, B2, D2 and C2 of the optical detection areas;
- the second optical detection unit is formed above the first optical detection unit, and is four-segmented into optical detection areas E1, E2, F1 and F2 on which the side beam having the +1-order diffraction coefficient is focused; and
- the third optical detection unit is formed below the first detection area, and is four-segmented into optical detection areas I1, I2, J1 and J2 on which the side beam having the −1-order diffraction coefficient is focused.

5. The optical pickup apparatus as set forth in claim 4, wherein, when the central and side beams of the diffracted light fall on the centers of the tracks of the optical disk, the optical detection means detects the focus error signal using the following equation that utilizes a Differential Astigmatic Detection (DAD) method based on the optical intensity distribution of the central and side beams formed on the optical detection units $$\text{Focus Error Signal}(FES) = (A1 + A2 + C1 + C2) - (B1 + B2 + D1 + D2) + \beta[(E1 + F2 + I1 + J2) - (F1 + F2 + J1 + I2)]$$

6. The optical pickup apparatus as set forth in claim 4, wherein, when the central and side beams of the diffracted light fall on the centers of the tracks of the optical disk, the optical detection means detects the tracking error signal using the following equation that utilizes the DPP method based on the optical intensity distribution of the central and side beams formed on the optical detection units $$\text{Tracking Error Signal}(TES) = (A1 + A2 + B1 + B2) - (C1 + C2 + D1 + D2) + \beta[(E1 + E2 + I1 + I2) - (F1 + F2 + J1 + J2)].$$

7. The optical pickup apparatus as set forth in claim 4, wherein, when at least one of the side beams of the diffracted light does not fall on the center of the track of the optical disk, the optical detection means detects the focus error signal using the following equation that utilizes the astigmatic detection method based on the optical intensity distribution of the first optical unit on which the central beam having a 0-order diffraction coefficient is focused $$\text{Focus Error Signal (FES)} = (A1+C1)-(B1+D1).$$

8. The optical pickup apparatus as set forth in claim 4, wherein, when at least one of the side beams of the diffracted light does not fall on the center of the track of the optical disk, the optical detection means detects the focus error signal using the following equation that utilizes another astigmatic detection method based on the optical intensity distribution of the first optical unit on which the central beam having a 0-order diffraction coefficient is focused $$\text{Focus Error Signal (FES)} = (A1+A2+C1+C2)-(B1+B2+D1+D2).$$

9. The optical pickup apparatus as set forth in claim 4, wherein, when at least one of the side beams of the diffracted light does not fall on the center of the track of the optical disk, the optical detection means detects the tracking error signal using the following equation that utilizes the MPP method based on the optical intensity distribution of the center areas of the first detection unit on which the tracking error signal is not formed $$\text{Tracking Error Signal}(TES) = (A1 + B1) - (C1 + D1) - \beta[(A2 + B2) - (C2 + D2)].$$

10. The optical pickup apparatus as set forth in claim 4, wherein, when at least one of the side beams of the diffracted light does not fall on the center of the track of the optical disk, the optical detection means detects the tracking error signal using the following equation that utilizes another MPP method based on the optical intensity distribution of the center areas of the first detection unit on which the tracking error signal is not formed $$\text{Tracking Error Signal }(TES) = (A1 + A2 + B1 + B2) - (C1 + C2 + D1 + D2) - \beta[(A2 + B2) - (C2 + D2)].$$

11. The optical pickup apparatus as set forth in claim 1, wherein:
- the first optical detection unit is four-segmented into optical detection areas A, B, C and D on which the central beam having a 0-order diffraction coefficient is focused;
- the second optical detection unit is eight-segmented into optical detection areas $E_{A1}$, $E_{B1}$, $E_{A2}$, $E_{B2}$, $F_{A2}$, $F_{B2}$, $F_{A1}$ and $F_{B1}$ on which the side beam having a +1-order diffraction coefficient is focused, and the tracking error signal is not formed on the optical detection areas $E_{A2}$, $E_{B2}$, $F_{A2}$ and $F_{B2}$; and
- the third optical detection unit is eight-segmented into areas $I_{A1}$, $I_{B1}$, $I_{A2}$, $I_{B2}$, $J_{A2}$, $J_{B2}$, $J_{A1}$ and $J_{B1}$ and the tracking error signal is not formed on the optical detection areas $I_{A2}$, $I_{B2}$, $J_{A2}$ and $J_{B2}$.

12. The optical pickup apparatus as set forth in claim 11, wherein, when the central and side beams of the diffracted light fall on the centers of the tracks of the optical disk, the optical detection means detects the focus error signal using the following equation that utilizes a Differential Astigmatic Detection (DAD) method based on the optical intensity distribution of the central and side beams focused on the optical detection units Focus Error Signal $(FES) = (A + C) - (B + D) + \beta[(E_{A1} + E_{A2} + F_{B1} + F_{B2} + I_{A1} + I_{A2} + J_{B1} + J_{B2}) - (F_{A1} + F_{A2} + E_{B1} + E_{B2} + J_{A1} + J_{A2} + I_{B1} + I_{B2})]$.

13. The optical pickup apparatus as set forth in claim 11, wherein, when the central and side beams of the diffracted light fall on the centers of the tracks of the optical disk, the optical detection means detects the tracking error signal using the following equation that utilizes a DPP method based on the optical intensity distribution of the central and side beams focused on the optical detection units Tracking Error Signal $(TES) =$
$(A + B) - (D + C) + \beta[(E_{A1} + E_{A2} + E_{B1} + E_{B2} + I_{A1} + I_{A2} + I_{B1} + I_{B2}) - (F_{A1} + F_{A2} + F_{B1} + F_{B2} + J_{A1} + J_{A2} + J_{B1} + J_{B2})]$.

14. The optical pickup apparatus as set forth in claim 11, wherein, when at least one of the side beams of the diffracted light does not fall on the center of the track of the optical disk, the optical detection means detects the focus error signal using the following equation that utilizes an astigmatic detection method based on the optical intensity distribution of the first optical detection unit on which the central beam having a 0-order diffraction coefficient is focused Focus Error Signal (FES)=$(A+C)-(B+D)$.

15. The optical pickup apparatus as set forth in claim 11, wherein, when at least one of the side beams of the diffracted light does not fall on the center of the track of the optical disk, the optical detection means detects the tracking error signal using the following equation that utilizes an MPP method based on optical intensity distribution of center areas of the second and third optical detection units, on which the tracking error signal is not formed, to compensate for the tracking error offset Tracking Error Signal (TES)=$(A+B)-(D+C)+\beta[(E_{A2}+E_{B2}+I_{A2}+I_{B2})-(F_{A2}+F_{B2}+J_{A2}+J_{B2})]$.

16. The optical pickup apparatus as set forth in claim 1, wherein:
the first optical detection unit is eight-segmented into optical detection areas A1, B1, A2, B2, D2, C2, D1 and C1 on which the central beam having a 0-order diffraction coefficient is focused, and the tracking error signal is not formed on center ones A2, B2, D2 and C2 of the optical detection areas;
the second optical detection unit is formed above the first detection unit and is eight-segmented into optical detection areas $E_{A1}$, $E_{B1}$, $E_{A2}$, $E_{B2}$, $F_{A2}$, $F_{B2}$, $F_{A1}$ and $F_{B1}$ on which the side beam having a +1-order diffraction coefficient is focused, and the tracking error signal is not formed on the center ones $E_{A2}$, $E_{B2}$, $F_{A2}$ and $F_{B2}$ of the optical detection areas; and
the third optical detection unit is formed below the first optical detection unit and is eight-segmented into areas $I_{A1}$, $I_{B1}$, $I_{A2}$, $I_{B2}$, $J_{A2}$, $J_{B2}$, $J_{A1}$ and $J_{B1}$, and the tracking error signal is not formed on the center ones $I_{A2}$, $I_{B2}$, $J_{A2}$ and $J_{B2}$ of the optical detection areas.

17. The optical pickup apparatus as set forth in claim 16, wherein, when the central and side beams of the diffracted light fall on the centers of the tracks of the optical disk, the optical detection means detects the focus error signal using the following equation that utilizes a Differential Astigmatic Detection (DAD) method based on optical intensity distribution of the central and side beams focused on the optical detection units Focus Error Signal $(FES) = (A1 + A2 + C1 + C2) - (B1 + B2 + D1 + D2) + \beta[(E_{A1} + E_{A2} + F_{B1} + F_{B2} + I_{A1} + I_{A2} + J_{B1} + J_{B2}) - (F_{A1} + F_{A2} + E_{B1} + E_{B2} + J_{A1} + J_{A2} + I_{B1} + I_{B2})]$.

18. The optical pickup apparatus as set forth in claim 16, wherein, when the central and side beams of the diffracted light fall on centers of tracks of the optical disk, the optical detection means detects the tracking error signal using the following equation that utilizes a DPP method based on optical intensity distribution of the central and side beams focused on the optical detection units Tracking Error Signal $(TES) =$
$(A1 + A2 + B1 + B2) - (C1 + C2 + D1 + D2) + \beta[(E_{A1} + E_{A2} + E_{B1} + E_{B2} + I_{A1} + I_{A2} + I_{B1} + I_{B2}) - (F_{A1} + F_{A2} + F_{B1} + F_{B2} + J_{A1} + J_{A2} + J_{B1} + J_{B2})]$.

19. The optical pickup apparatus as set forth in claim 16, wherein, when at least one of the side beams of the diffracted light does not fall on the center of the track of the optical disk, the optical detection means detects the focus error signal using the following equation that utilizes an astigmatic detection method based on optical intensity distribution of the first detection unit on which the central beam having a 0-order diffraction coefficient is focused Focus Error Signal (FES)=$(A1+C1)-(B1+D1)$.

20. The optical pickup apparatus as set forth in claim 16, wherein, when at least one of the side beams of the diffracted light does not fall on the center of the track of the optical disk, the optical detection means detects the focus error signal using the following equation that utilizes another astigmatic detection method using optical intensity distribution of the first optical detection unit, on which the central beam having an 0-order diffraction coefficient is focused, to compensate for the tracking error offset Focus Error Signal (FES)=$(A1+A2+C1+C2)-(B1+B2+D1+D2)$.

21. The optical pickup apparatus as set forth in claim 16, wherein, when at least one of the side beams of the diffracted light does not fall on the center of the track of the optical disk, the optical detection means detects the tracking error signal using the following equation that utilizes an MPP method using optical intensity distribution of center areas of the second and third optical detection units, on which the tracking error signal is not formed, to compensate for the tracking error offset Tracking Error Signal $(TES) = (A1 + B1) - (C1 + D1) - \beta[(E_{A2} + E_{B2} + I_{A2} + I_{B2}) - (F_{A2} + F_{B2} + J_{A2} + J_{B2})]$.

22. The optical pickup apparatus as set forth in claim 16, wherein, when at least one of the side beams of the diffracted light does not fall on the center of the track of the optical disk, the optical detection means detects the tracking error signal using the following equation that utilizes an MPP method using optical intensity distribution of center areas of the first, second and third optical detection units, on which the tracking error signal is not formed, to compensate for the tracking error offset $$\text{Tracking Error Signal } (TES) = \\ (A1 + A2 + B1 + B2) - (C1 + C2 + D1 + D2) - \\ \beta[(E_{A2} + E_{B2} + I_{A2} + I_{B2}) - (F_{A2} + F_{B2} + J_{A2} + J_{B2})].$$

* * * * *